(12) United States Patent
Perez et al.

(10) Patent No.: US 6,646,019 B2
(45) Date of Patent: Nov. 11, 2003

(54) FIBRILLATED FOAM ARTICLE

(75) Inventors: Mario A. Perez, Burnsville, MN (US); Christopher K. Haas, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/230,539

(22) Filed: Aug. 29, 2002

(65) Prior Publication Data

US 2003/0008933 A1 Jan. 9, 2003

Related U.S. Application Data

(62) Division of application No. 09/602,978, filed on Jun. 23, 2000, now Pat. No. 6,468,451.

(51) Int. Cl.$^7$ .............................................. C08F 216/06
(52) U.S. Cl. ...................................................... 521/142
(58) Field of Search ................................. 521/142, 143, 521/144, 149, 79

(56) References Cited

U.S. PATENT DOCUMENTS

| | | |
|---|---|---|
| 2,532,011 A | 11/1950 | Dahlquist et al. |
| 2,607,711 A | 8/1952 | Hendricks |
| 3,318,852 A | 5/1967 | Dixon |
| 3,502,497 A | 3/1970 | Crocker |
| 3,549,470 A | 12/1970 | Greenwald et al. |
| 3,576,931 A | 4/1971 | Chopra et al. |
| 3,893,957 A | 7/1975 | Mixon et al. |
| 3,969,472 A | 7/1976 | Driscoll |
| 4,150,184 A | 4/1979 | Tesch |
| 4,241,198 A | 12/1980 | Kobayashi |
| 4,264,672 A | 4/1981 | Taylor-Brown et al. |
| 4,486,366 A | 12/1984 | Reddy |
| 4,714,716 A | 12/1987 | Park |
| 4,728,571 A | 3/1988 | Clemens et al. |
| 4,916,198 A | 4/1990 | Scheve et al. |
| 4,940,736 A | 7/1990 | Alteepping et al. |
| 5,032,460 A | 7/1991 | Kantner et al. |
| 5,160,674 A | 11/1992 | Colton et al. |
| 5,202,190 A | 4/1993 | Kantner et al. |
| 5,214,119 A | 5/1993 | Leir et al. |
| 5,290,615 A | 3/1994 | Tushaus et al. |
| 5,356,706 A | 10/1994 | Shores |
| 5,429,856 A | 7/1995 | Krueger et al. |
| 5,599,602 A | 2/1997 | Leonard et al. |
| 5,605,936 A | 2/1997 | DeNicola, Jr. et al. |
| 5,750,630 A | 5/1998 | Sengupta |

FOREIGN PATENT DOCUMENTS

| | | |
|---|---|---|
| DE | 19840991 A1 | 3/2000 |
| EP | 0 375 781 B1 | 7/1990 |
| GB | 1157695 | 7/1969 |
| GB | 2061281 B | 5/1981 |
| JP | 2000256934 | 9/2000 |
| WO | WO 97/07272 | 2/1997 |
| WO | WO 00/00520 | 1/1998 |
| WO | WO 98/08667 | 3/1998 |
| WO | WO 99/06623 | 2/1999 |
| WO | WO 99/32544 | 7/1999 |
| WO | WO 99/36466 | 7/1999 |
| WO | WO 99/47573 | 9/1999 |
| WO | WO 99/60053 | 11/1999 |
| WO | WO 99/61520 | 12/1999 |
| WO | WO 00/46435 | 8/2000 |

OTHER PUBLICATIONS

Encyclopedia of Polymer Science and Technology, vol. 1, Wiley–Interscience Publishers, New York, (1964).
Encyclopedia of Polymer Science and Engineering, vol. 13, Wiley–Interscience Publishers, New York, (1988).
J. I. Raukola, "New Technology to Manufacture Polypropylene Foam Sheet and Biaxially Oriented Foam Film", VTT Publications 361, Technical Research Center of Finland (1998).

*Primary Examiner*—Morton Foelak
(74) *Attorney, Agent, or Firm*—Kent S. Kokko

(57) ABSTRACT

A fibrillated foamed article and process for producing the same is described. The fibrillated articles are useful as tape backings, filters, thermal and acoustical insulation and as a diffuse reflector for use in optical applications such as computer displays and as reinforcement fibers for polymers or cast building materials such as concrete.

14 Claims, 4 Drawing Sheets

10μm

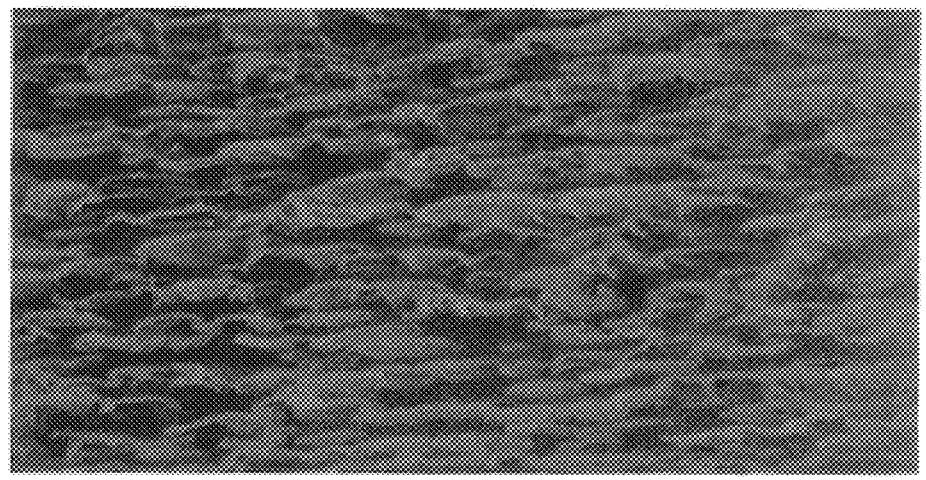
Fig. 4  100μm
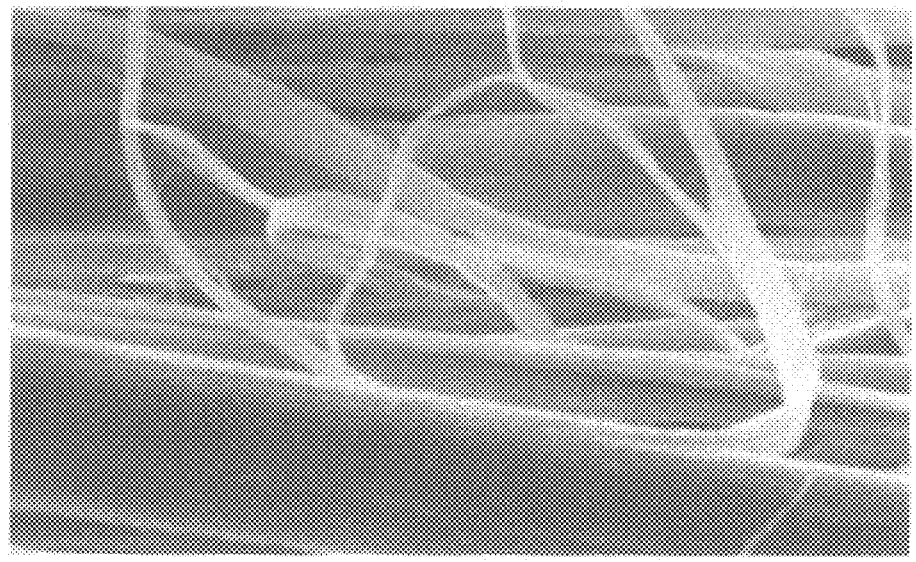
Fig. 5  10μm

100μm

FIBRILLATED FOAM ARTICLE

This application is a divisional of U.S. Ser. No. 09/602,978, filed Jun. 23, 2000, now U.S. Pat. No. 6,468,451, the disclosure of which is herein incorporated by reference.

The present invention is directed to a process for preparing a fibrillated article, the process comprising the steps of fibrillating an oriented, high melt strength polypropylene foam. The foam may be prepared by extruding a foamable mixture comprising a high melt-strength polypropylene and a blowing agent, and orienting in at least one direction

SUMMARY OF THE INVENTION

The present invention is further directed to a process for producing a fibrillated article, prepared from an oriented foamed polymer. The fibrillated articles are useful as tape backings, filters, thermal and acoustical insulation and as a diffuse reflector for use in optical applications such as computer displays and as reinforcement fibers for polymers or cast building materials such as concrete.

In another aspect, the present invention provides a process for preparing a fibrillated article, using a foamable mixture comprising a major amount of a high melt-strength polypropylene and a minor amount of a second polymer component comprising a semicrystalline or amorphous thermoplastic polymer. Polymer mixtures comprising a high melt-strength polypropylene and two or more added polymers are also within the scope of the invention.

In another aspect, the present invention provides fibrillated articles prepared by the process of the invention. The present invention also provides fibrillated articles that comprise an oriented, high melt strength polypropylene foam having a fibrillated surface. The fibrillated surface may be fibrous or schistose in nature. The fibrillated article are useful as tape backings, filters, thermal and acoustical insulation and as reinforcement fibers for polymers or cast building materials such as concrete.

In another aspect the present invention provides polymeric microfibers prepared by the process of the invention. The microfibers are generally between about 0.5 and 10 $\mu$m in cross section, have relatively uniform fiber diameters, are low cost and may be prepared from readily available starting materials. The process of the invention can produce many different profiles of fibrillated article by fibrillation of the corresponding foam profile, such as sheet, blocks, tubes, cylinders, or rods.

As used in this invention:

"Alpha-transition temperature", T$\alpha$c, is the temperature at which crystallite subunits of a polymer are capable of being moved within the larger lamellar crystal unit. Above this temperature lamellar slip can occur, and extended chain crystals form, with the effect that the degree of crystallinity is increased as amorphous regions of the polymer are drawn into the lamellar crystal structure.

"small-cell foam" means a foam having cell sizes of less than 100 micrometers ($\mu$m), preferably 5 to 50 $\mu$m;

"closed-cell foam" means a foam that contains substantially no connected cell pathways that extend from one outer surface through the material to another outer surface;

"operating temperature" means the temperature that must be achieved in the extrusion process to melt all of the polymeric materials in the melt mix;

"exit temperature" and "exit pressure" mean the temperature and pressure of the extrudate in the final zone or zones of the extruder and preferably in the die;

"melt solution" or "melt mixture" or "melt mix" means a melt-blended mixture of polymeric material(s), any desired additives, and blowing agent(s) wherein the mixture is sufficiently fluid to be processed through an extruder;

"neat polymer" means a polymer that contains small amounts of typical heat-stabilizing additives, but contains no fillers, pigments or other colorants, blowing agents, slip agents, anti-blocking agents, lubricants, plasticizers, processing aids, antistatic agents, ultraviolet-light stabilizing agents, or other property modifiers;

"foam density" means the weight of a given volume of foam;

"density reduction" refers to a way of measuring the void volume of a foam based on the following formula:

where $\rho_R$ is the density reduction, $\rho_o$ is the foam density, and $\rho_0$ is the density of the original material;

"polydispersity" means the weight average cell diameter divided by the number average cell diameter for a particular foam sample; it is a means of measuring the uniformity of cell sizes in the sample;

"uniform" means that the cell size distribution has a polydispersity of 1.0 to 2.0;

"spherical" means generally rounded; it may include spherical, oval, or circular structure;

"fibrillose" or "fibrous" means having elongated filament-like or thread-like structures;

"schistose" means having parallel plate-like ribbons or flakes;

"polymer matrix" means the polymeric, or "non-cell," areas of a foam;

"$\alpha$-olefin" means an olefin having three or more carbon atoms and having a —CH=CH$_2$ group.

BRIEF DESCRIPTION OF THE FIGURES

FIG. 4 is a digital image of a SEM of a side elevation of the fibrillated foam of Example 1.

FIG. 5 is a digital image of a SEM of the fibers of Example 2.

DETAILED DESCRIPTION

Figure 1:
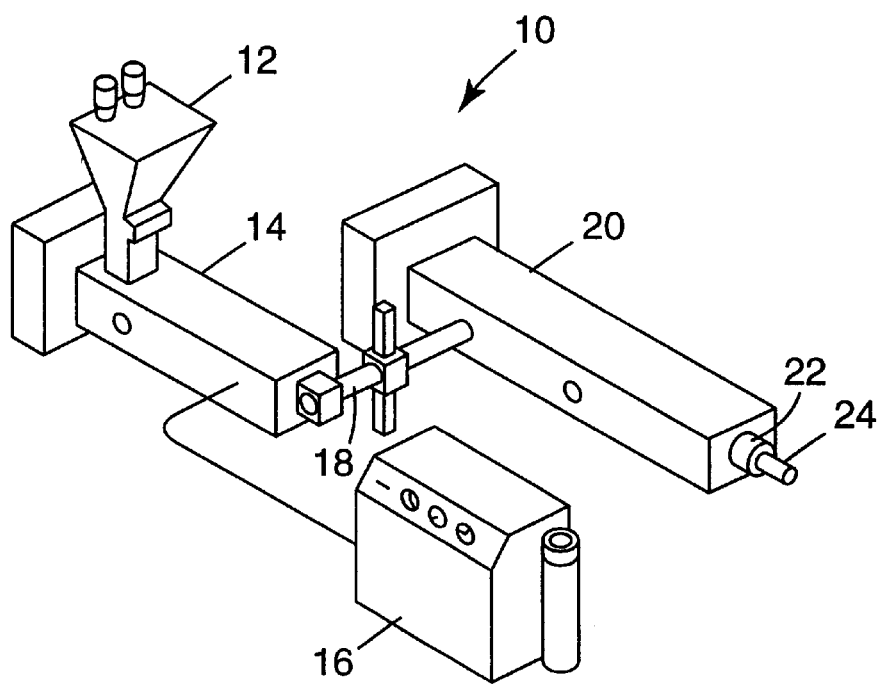
FIGS. 1 and 2 are schematics of processes for preparing the foams used in the present invention.

The high melt strength polypropylene useful in the present invention includes homo and copolymers containing 50 weight percent or more propylene monomer units, preferably at least 70 weight percent, and has a melt strength in the range of 25 to 60 cN at 190° C. Melt strength may be conveniently measured using an extensional rheometer by extruding the polymer through a 2.1 mm diameter capillary having a length of 41.9 mm at 190° C. and at a rate of 0.030 cc/sec; the strand is then stretched at a constant rate while measuring the force. Preferably the melt strength of the polypropylene is in the range of 30 to 55 cN, as described in WO 99/61520.

The melt strength of linear or straight chain polymers, such as conventional isotactic polypropylene, decreases rapidly with temperature. In contrast, the melt strength of highly branched polypropylenes does not decrease rapidly with temperature. It is generally believed that the differences in melt strengths and extensional viscosity are attributable to the presence of long chain branching. Useful polypropylene resins are those that are branched or crosslinked. Such high melt strength polypropylenes may be prepared by methods generally known in the art. Reference may be made to U.S. Pat. No. 4,916,198 (Scheve et al) which describes a high melt strength polypropylene having a chain-hardening elongational viscosity prepared by irradiation of linear propylene in a controlled oxygen environment. Other useful methods include those in which compounds are added to the molten polypropylene to introduce branching and/or crosslinking such as those methods described in U.S. Pat. No. 4,714,716 (Park), WO 99/36466 (Moad, et al.) and WO 00/00520 (Borve et al.). High melt strength polypropylene may also be prepared by irradiation of the resin as described in U.S. Pat. No. 5,605,936 (Denicola et al.). Still other useful methods include forming a bipolar molecular weight distribution as described in J. I. Raukola, *A New Technology To Manufacture Polypropylene Foam Sheet And Biaxially Oriented Foam Film*, VTT Publications 361, Technical Research Center of Finland, 1998 and in U.S. Pat. No. 4,940,736 (Alteepping and Nebe), incorporated herein by reference.

The foamable polypropylene may consist of propylene homopolymers or may comprise a copolymer having 50 wt % or more propylene monomer content. Further, the foamable polypropylene may comprise a mixture or blend of propylene homopolymers or copolymers with a homo- or copolymer other than propylene homo- or copolymers.

Particularly useful propylene copolymers are those of propylene and one or more non-propylenic monomers. Propylene copolymers include random, block, and graft copolymers of propylene and olefin monomers selected from the group consisting of C3–C8 α-olefins and C4–C10 dienes. Propylene copolymers may also include terpolymers of propylene and α-olefins selected from the group consisting of C3–C8α-olefins, wherein the α-olefin content of such terpolymers is preferably less than 45 wt %. The C3–C8α-olefins include 1-butene, isobutylene, 1-pentene, 3-methyl-1-butene, 1-hexene; 3,4-dimethyl-1-butene, 1-heptene, 3-methyl-1-hexene, and the like. Examples of C4–C10 dienes include 1,3-butadiene, 1,4-pentadiene, isoprene, 1,5-hexadiene, 2,3-dimethyl hexadiene and the like.

Other polymers that may be added to the high melt strength polypropylene in the foamable composition include high, medium, low and linear low density polyethylene, fluoropolymers, poly(1-butene), ethylene/acrylic acid copolymer, ethylene/vinyl acetate copolymer, ethylene/propylene copolymer, styrene/butadiene copolymer, ethylene/styrene copolymer, ethylene/ethyl acrylate copolymer, ionomers and thermoplastic elastomers such as styrene/ethylene/butylene/styrene (SEBS), and ethylene/propylene/diene copolymer (EPDM).

The present invention provides a process for preparing a fibrillated article comprising the step of fibrillating an oriented, high melt strength polypropylene foam wherein said oriented foam is prepared by the steps of extruding a mixture comprising a high melt-strength polypropylene and a blowing agent to produce a foam, and orienting the extruded foam in at least one direction. Preferably the method comprises mixing at least one high melt strength polypropylene and at least one blowing agent in an apparatus having an exit shaping orifice at a temperature and pressure sufficient to form a melt mixture wherein the blowing agent is uniformly distributed throughout the polypropylene; reducing the temperature of the melt mixture at the exit of the apparatus to an exit temperature that no more than 30° C. above the melt temperature of the neat polypropylene while maintaining the melt mixture at a pressure sufficient to prevent foaming; passing the mixture through said exit shaping orifice and exposing the mixture to atmospheric pressure, whereby the blowing agent expands causing cell formation resulting in foam formation; orienting the foam; and fibrillating the foam.

An extrusion process using a single-screw, twin-screw or tandem extrusion system may prepare the foams useful in the present invention. This process involves mixing one or more high melt strength propylene polymers (and any optional polymers to form a propylene polymer blend) with a blowing agent, e.g., a physical or chemical blowing agent, and heating to form a melt mixture. The temperature and pressure conditions in the extrusion system are preferably sufficient to maintain the polymeric material and blowing agent as a homogeneous solution or dispersion. Preferably, the polymeric materials are foamed at no more than 30° C. above the melting temperature of the neat polypropylene thereby producing desirable properties such as uniform and/or small cell sizes.

When a physical blowing agent, such as $CO_2$ is used, the neat polymer is initially maintained above the melting temperature. The physical blowing agent is injected (or otherwise mixed) with the molten polymer and the melt mixture is cooled in the extruder to an exit temperature that is less than 30° C. above the melting temp of the neat polymer ($T \leq T_m + 30°$ C.) while the pressure is maintained at or above 2000 psi (13.8 MPa). Under these conditions the melt mixture remains a single phase. As the melt mixture passes through the exit/shaping die the melt rapidly foams and expands, generating foams with small, uniform cell sizes. It has been found that, by adding a physical blowing agent, the polypropylene may be processed and foamed at temperatures considerably lower than otherwise might be required. The blowing agent plasticizes, i.e., lowers the $T_m$ of, the polymeric material. The lower temperature can allow the foam to cool and stabilize soon after it exits the die, thereby making it easier to arrest cell growth and coalescence while the cells are smaller and more uniform.

When a chemical blowing agent is used, the blowing agent is added to the neat polymer, mixed, heated to a temperature above the $T_m$ of the polypropylene to ensure intimate mixing and further heated to the activation temperature of the chemical blowing agent, resulting in decomposition of the blowing agent. The temperature and pressure of the system are controlled to maintain substantially a single phase. The gas formed on activation is substantially dissolved or dispersed in the melt mixture. The resulting single phase mixture is cooled to an exit temperature no more than 30° C. above the melting temperature of the neat polymer, while the pressure is maintained at or above 2000 psi, (13.8 Mpa) by passing the mixture through a cooling zone(s) in the extruder prior to the exit/shaping die. Generally the chemical blowing agent is dry blended with the neat polymer prior to introduction to the extruder, such as in a mixing hopper.

With either a chemical or physical blowing agent, as the melt mixture exits the extruder through a shaping die, it is exposed to the much lower atmospheric pressure causing the blowing agent (or its decomposition products) to expand. This causes cell formation resulting in foaming of the melt mixture. When the exit temperature is no more than 30° C.

above the $T_m$ of the neat polypropylene, the extensional viscosity of the polymer increases as the blowing agent comes out of the solution and the polypropylene rapidly crystallizes. These factors arrest the growth and coalescense of the foam cells within seconds or, most typically, a fraction of a second. Preferably, under these conditions, the formation of small and uniform cells in the polymeric material occurs. When exit temperatures are in excess of 30° C. above the $T_m$ of the neat polymer, cooling of the polymeric material may take longer, resulting in non-uniform, unarrested cell growth. In addition to the increase in $T_m$, adiabatic cooling of the foam may occur as the blowing agent expands.

Either a physical or chemical blowing agent may plasticize, i.e., lower the $T_m$ and $T_g$ of, the polymeric material. With the addition of a blowing agent, the melt mixture may be processed and foamed at temperatures considerably lower than otherwise might be required, and in some cases may be processed below the melting temperature of the neat polypropylene. The lower temperature can allow the foam to cool and stabilize (i.e., reach a point of sufficient solidification to arrest further cell growth) and produce smaller and more uniform cell sizes.

Physical blowing agents useful in the present invention may be any material that is a vapor at the temperature and pressure at which the foam exits the die. The physical blowing agent may be introduced, i.e., injected, into the polymeric material as a gas, a supercritical fluid, or liquid, preferably as a supercritical fluid or liquid, most preferably as a liquid. The physical blowing agents used will depend on the properties sought in the resulting foam articles. Other factors considered in choosing a blowing agent are its toxicity, vapor pressure profile, ease of handling, and solubility with regard to the polymeric materials used. Flammable blowing agents such as pentane, butane and other organic materials may be used, but non-flammable, non-toxic, non-ozone depleting blowing agents such as hydrofluorocarbons (HFC), hydrochlorofluorocarbons (HCFC), and fully- or partially fluorinated ethers are preferred because they are easier to use, e.g., fewer environmental and safety concerns. Suitable physical blowing agents include, e.g., carbon dioxide, nitrogen, water, $SF_6$, nitrous oxide, argon, helium, noble gases such as xenon, air (nitrogen and oxygen blend), and blends of these materials.

Chemical blowing agents are added to the polymer at a temperature below that of the decomposition temperature of the blowing agent, and are typically added to the polymer feed at room temperature prior to introduction to the extruder. The blowing agent is then mixed to distribute it throughout the polymer in undecomposed form, above the melt temperature of the polymer, but below the activation temperature of the chemical blowing agent. Once dispersed, the chemical blowing agent may be activated by heating the mixture to a temperature above the decomposition temperature of the agent. Decomposition of the blowing agent liberates gases, such as $N_2$, CO, $CO_2$ and/or $H_2O$, yet cell formation is restrained by the temperature and pressure of the system. Useful chemical blowing agents typically decompose at a temperature of 140° C. or above. As previously described the mixture is cooled to a temperature at or below $T_m$+30° C. prior to exiting the die.

Examples of such materials include synthetic azo-, carbonate-, and hydrazide-based molecules, including azodicarbonamide, azodiisobutyronitrile, benzenesulfonylhydrazide, 4,4-oxybenzene sulfonyl-semicarbazide, p-toluene sulfonyl semi-carbazide, barium azodicarboxylate, N,N'-dimethyl-N,N'-dinitrosoterephthalamide and trihydrazino triazine. Specific examples of these materials are Celogen OT (4,4' oxybis (benzenesulfonylhydrazide), Hydrocerol BIF (preparation of carbonate compounds and polycarbonic acids), Celogen AZ (azodicarboxamide) and Celogen RA (p-toluenesulfonyl semicarbazide).

The amount of blowing agent incorporated into the foamable polymer mixture is chosen to yield a foam having a void content in excess of 10%, more preferably in excess of 20%, as measured by density reduction; i.e., [1—the ratio of the density of the foam to that of the neat polymer]×100. Generally, greater foam void content enhances the subsequent fibrillation and subsequently, the greater the yield of the fibrillated surface.

FIG. 1 illustrates a tandem extrusion apparatus 10 that may be used to make the foams of the present invention, and is a preferred process for use with a physical blowing agent. To form a melt mixture, polymeric material is initially fed from hopper 12 into a first extruder 14 that melts and conveys the polymeric material. The polymeric material may be added to extruder 14 in any convenient form. Additives are typically added with the polymer material but may be added further downstream. The blowing agent, typically in a liquid or supercritical form, is injected near the exit of the first extruder. Due to the conditions in the extruder, the blowing agent is typically in a supercritical state while in the extruder.

The polymers, additives, and blowing agent are melt-mixed in first extruder 14. The physical blowing agent is typically introduced by injection at some intermediate stage of extruder 14 by means of fluid handling equipment 16. The purpose of the melt-mixing step is to prepare a foamable, extrudable composition in which the blowing agent and other additives, to the extent present, are distributed homogeneously throughout the molten polymeric material. Specific operating conditions are selected to achieve such homogeneous distribution based upon the properties and characteristics of the particular composition being processed. The operating and exit pressures in extruder 14 should be sufficient to prevent the blowing agent from expanding in the extruder. The operating temperature in extruder 14 should be sufficient to melt and/or soften all of the polymers in the melt mixture.

Next, the melt mixture is fed to second extruder 20 (typically a single screw extruder) by means of conduit 18. Extruder 20 is generally operated at conditions (e.g., screw speed, screw length, pressure, and temperature) selected to achieve optimum mixing, and to keep the blowing agent in solution. Extruder 20 typically has a decreasing temperature profile wherein the temperature of the last zone or zones will bring the melt mixture to the desired exit temperature.

At the exit end of extruder 20, the foamable, extrudable composition is metered into die 22 which has a shaping/exit orifice (e.g., an annular, rod, slit, or shaped profile die). The temperature within die 22 is preferably maintained at substantially the same temperature as the last zone of extruder 20; i.e., at the exit temperature. The relatively high pressure within extruder 20 and die 22 prevents cell formation and foaming of the melt mixture. Exit pressure is dependent upon die orifice size, exit temperature, blowing agent concentration, polymer flowrate, polymer viscosity, screw speed and polymer. Exit pressure is typically controlled by adjusting the die orifice size, but can also be adjusted by altering the exit temperature, blowing agent concentration, and other variables. Reducing the size of the die orifice will generally increase exit pressure. As the composition exits die 22 through the die's shaping orifice, it is exposed to ambient pressure. The pressure drop causes the blowing agent to expand, leading to cell formation. Foam 24 is typically quenched, i.e., brought to a temperature below the $T_m$ of the polypropylene, within two to five centimeters of the die exit, more typically and preferably less than two centimeters, as the foamable material exits the die and is exposed to ambient pressure.

The shape of the die exit orifice dictates the shape of foam 24. A variety of shapes may be produced, including a continuous sheet (wherein the sheet may have a patterned profile), a tube, a rope, etc.

In general, as the blowing agent separates from the melt mixture, its plasticizing effect on the polymeric material decreases and the extensional viscosity of the polymeric material increases. The viscosity increase is much sharper at the $T_m$ than at the $T_g$ making the choice of foaming temperatures for semicrystalline polymers much more stringent than for amorphous polymers. As the temperature of the polymeric material approaches the $T_m$ of the neat polypropylene and becomes more viscous, the cells cannot as easily expand or coalesce. As the foam material cools further, it solidifies in the general shape of the exit shaping orifice of die 22.

Figure 2:
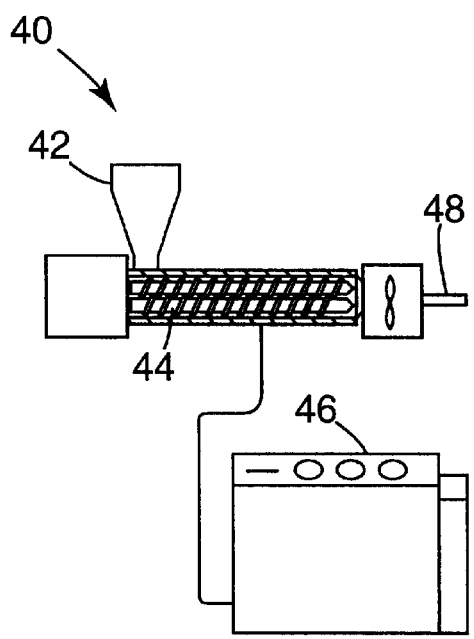
Figure 3:
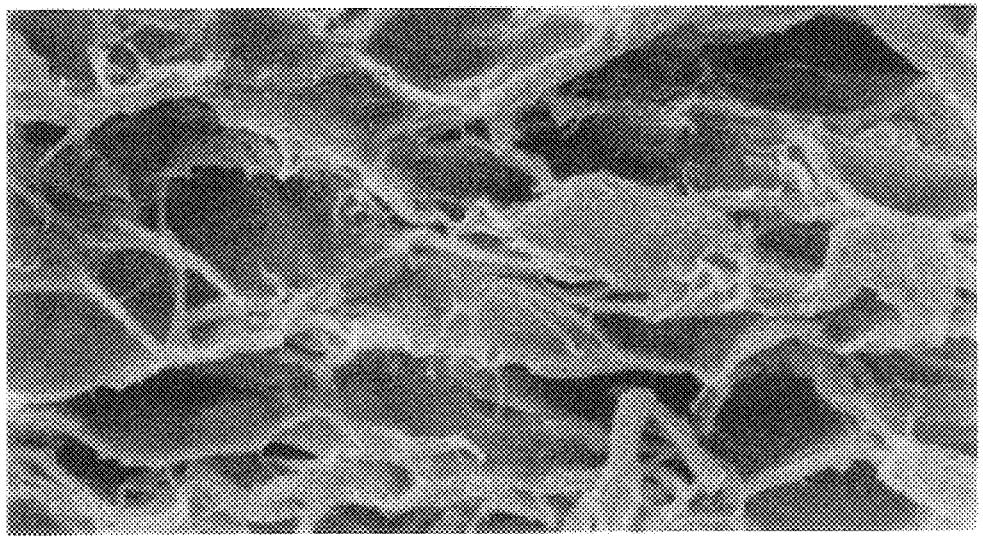
FIG. 3 is a digital image of a scanning electron micrograph (SEM) of a side elevation of the foam of Example 1.
Figure 6:
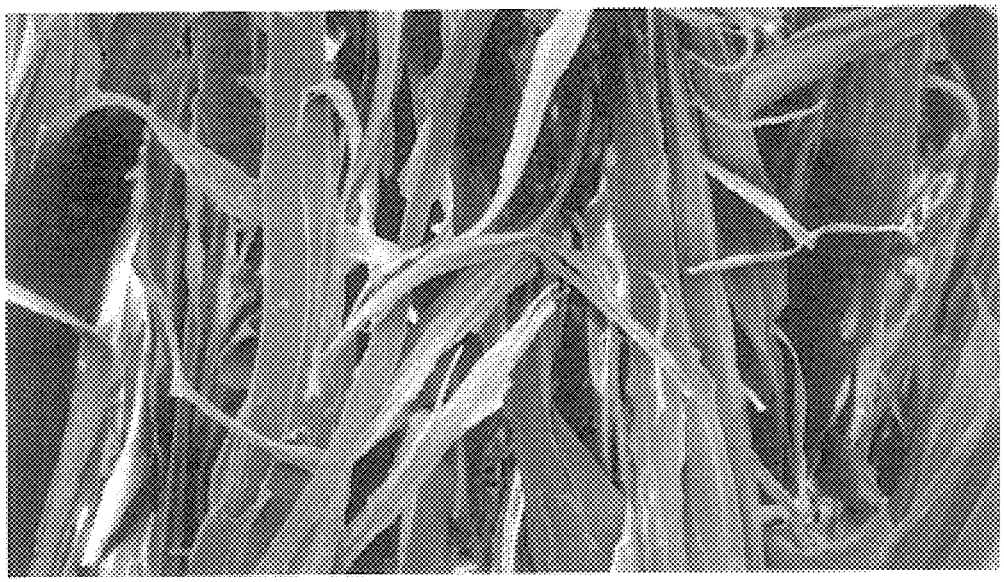
FIG. 6 is a digital image of a SEM of the fibrillated foam of Example 3.

FIG. 2 illustrates a single stage extrusion apparatus 40 that can be used to make the foams of the present invention, and is the preferred process for use with chemical blowing agents. A twin screw extruder 44 (as depicted) may be used to form a melt mixture of the polypropylene and blowing agent, although it will be understood that a single screw extruder may also be used. The polypropylene is introduced into zone 1 of extruder 44 by means of hopper 42. Chemical blowing agents are typically added with the polymer but may be added further downstream. A physical blowing agent may be added using fluid handling means 46 at a location downstream from a point at which the polymer has melted.

When a physical blowing agent is used, extruder 44 may be operated with a generally decreasing temperature profile. If a chemical blowing agent is used, an intermediate zone is generally maintained at an elevated temperature sufficient to initiate the chemical blowing agent, followed by subsequent cooler zones. The temperature of the initial zone(s) of the extruder must be sufficient to melt the polypropylene and provide a homogenous melt mixture with the blowing agent. The final zone or zones of the extruder are set to achieve the desired extrudate exit temperature.

Using a single stage extrusion process, as compared to using a tandem process, to produce a homogeneous foamable mixture requires mixing and transitioning from an operating temperature and pressure to an exit temperature and pressure over a shorter distance. To achieve a suitable melt mixture, approximately the first half of the extruder screw may have mixing and conveying elements which knead the polymer and move it through the extruder. The second half of the screw may have distributive mixing elements to mix the polymer material and blowing agent into a homogeneous mixture while cooling.

As with the tandem process, the operating and exit pressures (and temperatures) should be sufficient to prevent the blowing agent from causing cell formation in the extruder. The operating temperature is preferably sufficient to melt the polymer materials, while the last zone or zones of the extruder are preferably at a temperature that will bring the extrudate to the exit temperature.

At the exit end of the extruder, the foamable, extrudable composition is metered into die 48 having a shaping exit orifice. The foam is generated in the same manner as with the tandem system.

The blowing agent concentrations, exit pressure, and exit temperature can have a significant effect on the properties of the resulting foams including foam density, cell size, and distribution of cell sizes. In general, the lower the exit temperature, the more uniform, and smaller, the cell sizes of the foamed material. This is because at lower exit temperatures, the extensional viscosity is higher, yielding slower cell growth. Extruding the material at lower than normal extrusion temperatures, i.e. no more than 30° C. above the $T_m$ of the neat polymeric material, produces foams with small, uniform cell sizes.

In general, as the melt mixture exits the die, it is preferable to have a large pressure drop over a short distance. Keeping the solution at a relatively high pressure until it exits the die helps to produce uniform cell sizes. Maintaining a large pressure drop between the exit pressure and ambient pressure can also contribute to the quick foaming of a melt mixture. The lower limit for forming a foam with uniform cells will depend on the critical pressure of the blowing agent being used. In general, for the high melt-strength polypropylene useful in the invention, the lower exit pressure limit for forming acceptably uniform cells is approximately 7 MPa ( 1000 psi), preferably 10 MPa ( 1500 psi), more preferably 14 MPa ( 2000 psi). The smallest cell sizes may be produced at low exit temperatures and high blowing agent concentrations. However at any given temperature and pressure, there is a blowing agent concentration at and above which polydispersity will increase because the polymer becomes supersaturated with blowing agent and a two phase system is formed.

The optimum exit temperature, exit pressure, and blowing agent concentration for a particular melt mixture will depend on a number of factors such as the type and amount of polymer(s) used; the physical properties of the polymers, including viscosity; the mutual solubility of the polymer(s) and the blowing agent; the type and amount of additives used; the thickness of the foam to be produced; the desired density and cell size; whether the foam will be coextruded with another foam or an unfoamed material; and the die gap and die orifice design.

The present invention provides foams having average cell sizes less than 100 micrometers, and advantageously may provide foams having average cell sizes less than 50 micrometers. Additionally the foams produced have a closed cell content of 70 percent or greater. As result of extrusion, the cells will be elongated in the machine direction.

In order to optimize the physical properties of the foam and fibrillated article, the polymer chains need to be oriented along at least one major axis (uniaxial), and may further be oriented along two major axes (biaxial). The degree of molecular orientation is generally defined by the draw ratio, that is, the ratio of the final length to the original length.

Upon orientation, greater crystallinity is imparted to the polypropylene component of the foam and the dimensions of the foam cells change. Typical cells have major directions X and Y, proportional to the degree of orientation in the machine and transverse direction respectively. A minor direction Z, normal to the plane of the foam, remains substantially the same as (or may be moderately less than) the cross-sectional dimension of the cell prior to orientation.

The conditions for orientation are chosen such that the integrity of the foam is maintained. Thus, when stretching in the machine and/or transverse directions, the orientation temperature is chosen such that substantial tearing or fragmentation of the continuous phase is avoided and foam integrity is maintained. The foam is particularly vulnerable to tearing, cell rupture or even catastrophic failure if the orientation temperature is too low or the orientation ratio(s) is/are excessively high. Generally the foam is oriented at a temperature between the glass transition temperature and the melting temperature of the neat polypropylene. Preferably, the orientation temperature is above the alpha transition temperature of the neat polymer. Such temperature conditions permit optimum orientation in the X and Y directions without loss of foam integrity, consequently maximizing the ease with which the surface(s) may be fibrillated.

Unexpectedly, it has been found that orienting reduces the foam density, thus enabling the production of lower density foams than are achievable using blowing agents alone. Up to a 60% reduction in density has been observed. Further, fibrillation of oriented foams requires less fluid pressure (i.e. less energy) than does fibrillation of unfoamed films that have a higher degree of orientation. The instant invention provides additional benefits to the ultimate fibrillated article such as lower operating and equipment costs, better insulation properties, better tear properties and ease of manufacturing.

After orientation the cells are relatively planar in shape and have distinct boundaries. Cells are generally coplanar with the major surfaces of the foam, with major axes in the machine (X) and transverse (Y) directions (directions of orientation). The sizes of the cells are substantially uniform and dependent on concentration of blowing agent, extrusion conditions and degree of orientation. The percentage of closed cells does not change significantly after orientation when using high melt strength polypropylene. In contrast, orientation of conventional polypropylene foam results in cell collapse and tearing of the foam, reducing the percentage of closed cells. Cell size, distribution and amount in the foam matrix may be determined by techniques such as scanning electron microscopy.

In the orienting step, the foam is stretched in the machine direction and may be simultaneously or sequentially stretched in the transverse direction. When first stretched in the machine direction, the individual fibrils of the spherulites of the polypropylene are drawn substantially parallel to the machine direction (direction of orientation) of the film and in the plane of the film. The oriented fibrils can be visualized as having a rope-like appearance. Subsequent or further orientation of the film in the transverse direction results in reorientation of the fibrils, again in the plane of the film, with varying populations along the X,Y and intermediate axes, depending on the degree of orientation in the machine and transverse directions.

The stretching conditions are chosen to increase the crystallinity of the polymer matrix and the void volume of the foam. It has been found that an oriented foam is readily fibrillated, even with a relatively low void content when compared to oriented, unfoamed films, and is readily fibrillated at a lower total draw ratio compared to unfoamed film. In other words, the foams need not be as highly oriented as films to achieve subsequent fibrillation. As used herein "total draw ratio" is the product of the draw ratios in the machine and transverse directions, i.e. =MD×TD.

Additionally, the high melt strength polypropylene allows the preparation of foams with smaller cell sizes, and a larger density decrease on orientation (to produce a lower density foam) than conventional polypropylene. Lower density foams may be more easily fibrillated than higher density foams. The high melt strength polypropylene also allows higher draw ratios to produce fibrillated articles and fibers having higher tensile strength than can be achieved with conventional polypropylene.

The foam may be biaxially oriented by stretching in mutually perpendicular directions at a temperature above the alpha transition temperature and below the melting temperature of the polypropylene. Generally, the foam is stretched in one direction first and then in a second direction perpendicular to the first. However, stretching may be effected in both directions simultaneously if desired. If biaxial orientation is desired, it is preferable to simultaneously orient the foam, rather than sequentially orient the foam along the two major axes. It has been found that simultaneous biaxial orientation provides improved physical properties such as tensile strength as compared to sequential biaxial orientation.

In a typical sequential orientation process, the foam is stretched first in the direction of extrusion over a set of rotating rollers then stretched in the transverse direction by means of a tenter apparatus. Alternatively, foams may be stretched in both the machine and transverse directions in a tenter apparatus. Foams may be stretched in one or both directions 3 to 50 times total draw ratio (MD×TD). Greater orientation is achievable using foams of small cell size; foams having cell size of greater than 100 micrometers are not readily oriented more than 20 times, while foams having a cell size of 50 micrometers or less may be stretched up to 50 times total draw ratio.

The temperature of the polymer foam during the first orientation (or stretching) step affects foam properties. Generally, the first orientation step is in the machine direction. Orientation temperature may be controlled by the temperature of heated rolls or by the addition of radiant energy, e.g., by infrared lamps, as is known in the art. A combination of temperature control methods may be utilized. Too low an orientation temperature may result in tearing the foam and rupturing the cells. Orientation is generally conducted at temperatures between the glass transition temperature and the melting temperature of the neat polypropylene, i.e. at about 110–170° C., preferably 110–140° C. A second orientation, in a direction perpendicular to the first orientation may be desired. The temperature the foam during the second orientation step is generally similar to or higher than the temperature of the first orientation.

After the foam has been stretched it may be further processed. For example, the foam may be annealed or heat-set by subjecting the foam to a temperature sufficient to further crystallize the polypropylene while restraining the foam against retraction in both directions of stretching.

The final thickness of the foam will be determined in part by the extrudate thickness, the degree of orientation, and any additional processing. For most uses, the final thickness of the foam prior to fibrillation will be 2 to 100 mils ( 0.05 to 2.5 mm), preferably 10 to 60 mils ( 0.25 to 1.5 mm).

The oriented foam may be fibrillated by imparting sufficient fluid energy to the surface to release the fibers (or fibrous flakes) from the polymer matrix. Optionally, prior to fibrillation, the foam may be subjected to a mechanical fibrillation step by conventional means to produce macroscopic fibers from the film. The conventional means of mechanical fibrillation uses a rotating drum or roller having cutting elements such as needles or teeth in contact with the moving film. The teeth may fully or partially penetrate the surface of the film to impart a fibrillated surface thereto. Other similar macrofibrillating treatments are known and include such mechanical actions as twisting, brushing (as with a porcupine roller), rubbing, for example with leather pads, and flexing. The fibers obtained by such conventional fibrillation processes are macroscopic in size, generally several hundreds of microns in cross section. Such macroscopic fibers are useful in a myriad of products such as particulate filters, as oil absorbing media, and as electrets.

The oriented foam may be fibrillated by imparting sufficient fluid energy thereto to produce a fibrillated surface, for example, by contacting a portion of at least one surface of the film with a high-pressure fluid. In the present fibrillation process, relatively greater amounts of energy are imparted to the film surface to release microfibers, relative to that of a conventional mechanical fibrillation process. Surprisingly, it has been found that less energy is required to fibrillate oriented foams than is required for non-foamed polymer films. Thus the present invention provides oriented foams having a fibrous surface ( for uniaxially oriented foams) or a schistose surface (for biaxially oriented foams).

One method of fibrillating the surface of the foam is by means of fluid jets. In this process one or more jets of a fine fluid stream impact the surface of the foam, which may be supported by a screen or moving belt, thereby releasing fibers from the uniaxially oriented foam, or fibrous flakes from the biaxially oriented foam. One or both surfaces of the foam may be fibrillated. The degree of fibrillation is dependent on exposure time of the foam to the fluid jet, pressure of the fluid jet, cross-sectional area of the fluid jet, fluid contact angle, polymer properties, including composition of the high melt strength polymer, void content of the foam and, to a lesser extent, fluid temperature. Different types and sizes of screens can be used to support the foam.

Any type of liquid or gaseous fluid may be used. Liquid fluids may include water or organic solvents such as ethanol or methanol. Suitable gases such as nitrogen, air or carbon dioxide may be used, as well as mixtures of liquids and gases. Any such fluid is preferably non-swelling (i.e., is not absorbed by the polymer matrix), which would reduce the orientation and degree of crystallinity of the fibers or flakes. Preferably the fluid is water. The fluid temperature may be elevated, although suitable results may be obtained using ambient temperature fluids. For some polymer systems it may be advantageous to use temperatures below the glass transition temperature of, e.g., elastomeric components, to facilitate fibrillation.

The pressure of the fluid should be sufficient to impart some degree of fibrillation to at least a portion of the foam, and suitable conditions can vary widely depending on the fluid, the nature of the polymer, including the composition and morphology, configuration of the fluid jet, angle of impact and temperature. Typically, the fluid is water at room temperature and at pressures of at least 3400 kPa ( 500 psi), although lower pressure and longer exposure times may be used. In particular, a 5 mil thick ( 0.125 mm) oriented foam as described may be fibrillated with as little as 250 psi ( 1700 kPa). Such fluid pressure will generally impart a minimum of 5 watts or 10 W/cm$^2$ based on calculations assuming incompressibility of the fluid, a smooth surface and no losses due to friction.

The configuration of the fluid jets, i.e., the cross-sectional shape, may be nominally round, but other shapes may be employed as well. The jet or jets may comprise a slot which traverses a section or which traverses the width of the film. The jet(s) may be stationary, while the foam is conveyed relative to the jet(s), the jet(s) may move relative to a stationary foam, or both the foam and jet may move relative to each other. For example, the foam may be conveyed in the machine (longitudinal) direction by means of feed rollers while the jets move transverse to the web. Preferably, a plurality of jets is employed, while the foam is conveyed through the fibrillation chamber by means of rollers, while a screen or scrim, which allows the fluid to drain from the microfibrillated surface, supports the foam. The film may be fibrillated in a single pass, or alternatively the film may be fibrillated using multiple passes past the jets.

The jet(s) may be configured such that all or part of the foam surface is fibrillated. Alternatively, the jets may be configured so that only selected areas of the foam are fibrillated. Certain areas of the foam may also be masked, using conventional masking agents to leave selected areas free from fibrillation. Likewise the process may be conducted so that the fibrillated surface penetrates partially or fully through the thickness of the starting foam. If it is desired that the fibrillated surface extend through the thickness of the foam, conditions may be selected so that the integrity of the article is maintained and the foam is not severed into individual yarns or fibers.

Preferably the foam is supported using a screen having a predetermined pattern and/or mesh size. It has been found the use of such support screens will impart a pattern, corresponding to the screen pattern on the fibrillated surface. When fibrillating a biaxially oriented foam using a mesh pattern support screen, the resulting schistose surface bears a pattern resembling the warp and weft of a textile, rendering an article cloth-like in appearance. Screens may also be placed between the jet and the foam for use as a mask, moving with the foam during fibrillation. Masked portions of the foam will not be fibrillated, preserving the original properties of the foam in the masked areas. Patterned screens having an aspect ratio can impart a pattern to direct the tear of the film (for hand-tearable films and tapes) in a given direction. Useful support screens are available, for example, from Ron-Vik Inc., Minneapolis, Minn.

A hydroentangling machine, for example, can be employed to fibrillate one or both surfaces by exposing the fibrous material to the fluid jets. Hydroentangling machines are generally used to enhance the bulkiness of microfibers or yarns by using high-velocity water jets to wrap or knot individual microfibers in a web bonding process; a process also referred to as jet lacing or spunlacing. Alternatively a pressure water jet, with a swirling or oscillating head, may be used, which allows manual control of the impingement of the fluid jet.

The fibrillation may be conducted by immersing the sample in a high energy cavitating medium. One method of achieving this cavitation is by applying ultrasonic waves to the fluid. The rate of microfibrillation is dependent on the cavitation intensity. Ultrasonic systems can range from low acoustic amplitude, low energy ultrasonic cleaner baths, to focused low amplitude systems up to high amplitude, high intensity acoustic probe systems.

One method which comprises the application of ultrasonic energy involves using a probe system in a liquid medium in which the foam is immersed. The horn (probe) should be at least partially immersed in the liquid. For a probe system, the foam is exposed to ultrasonic vibration by positioning it between the oscillating horn and a perforated metal or screen mesh in the medium. Other methods of positioning are also possible. Advantageously, both major surfaces of the film are microfibrillated when using ultrasound. The depth of fibrillation in the fibrous material is dependent on the intensity of cavitation, amount of time that it spends in the cavitating medium and the properties of the foam, including the composition of the polymer and void content of the foam. The intensity of cavitation is a factor of many variables such as the applied amplitude and frequency of vibration, the liquid properties, fluid temperature and applied pressure and location in the cavitating medium. The intensity (power per unit area) is typically highest beneath the horn, but this may be affected by focusing of the sonic waves.

The method comprises positioning the foam between the ultrasonic horn and a film support in a cavitation medium (typically water) held in a tank. The support serves to restrain the film from moving away from the horn due to the extreme cavitation that takes place in this region. The foam can be supported by various means, such as a screen mesh, a rotating device that may be perforated or by adjustment of tensioning rollers which feed the film to the ultrasonic bath. Foam tension against the horn can be alternatively used, but correct positioning provides better fibrillation efficiency. The distance between the opposing faces of the foam and the horn and the screen is generally less than about 5 mm (0.2 inches). The distance from the foam to the bottom of the tank can be adjusted to create a standing wave that can maximize cavitation power on the foam, or alternatively other focusing techniques can be used. Other horn to film distances can also be used. The best results typically occur when the foam is positioned near the horn or at ¼ wavelength distances from the horn, however this is dependent factors such as the shape of the fluid container and radiating surface used. Generally positioning the sample near the horn, or the first or second ¼ wavelength distance is preferred.

The ultrasonic pressure amplitude can be represented as:

$$P_0 = 2\pi B/\lambda = (2\pi/\lambda)\rho c^2 y_{max}$$

The intensity can be represented as:

$$I = (P_0)^2/2\rho c$$

where $P_0$=maximum (peak) acoustic pressure amplitude

I=acoustic intensity

B=bulk modulus of the medium $\lambda$=wavelength in the medium $y_{max}$=peak acoustic amplitude $\rho$=density of the medium, and c=speed of the wave in the medium Ultrasonic cleaner bath systems typically can range from 1 to 10 watt/cm2 while horn (probe) systems can reach 300 to 1000 watt/cm$^2$ or more. Generally, the power density levels (power per unit area, or intensity) for these systems may be determined by the power delivered divided by the surface area of the radiating surface. However, the actual intensity may be somewhat lower due to wave attenuation in the fluid. Conditions are chosen so as to provide acoustic cavitation. In general, higher amplitudes and/or applied pressures provide more cavitation in the medium. Generally, the higher the cavitation intensity, the faster the rate of microfiber production and the finer (smaller diameter) the microfibers that are produced. While not wishing to be bound by theory, it is believed that high pressure shock waves are produced by the collapse of the incipient cavitation bubbles, which impacts the film resulting in fibrillation.

The ultrasonic oscillation frequency is usually 20 to 500 kHz, preferably 20–200 kHz and more preferably 20–100 kHz. However, sonic frequencies can also be utilized without departing from the scope of this invention. The power density (power per unit area, or intensity) can range from 1 W/cm$^2$ to 1 kW/cm$^2$ or higher. In the present process it is preferred that the power density be 10 watt/cm$^2$ or more, and preferably 50 watt/cm$^2$ or more.

The gap between the foam and the horn can be, but it is not limited to, 0.001 to 3.0 inches (0.03 to 76 mm), preferably 0.005 to 0.05 inches (0.13 to 1.3 mm). The temperature can range from 5 to 150° C., preferably 10 to 100° C., and more preferably from 20 to 60° C. A surfactant or other additive can be added to the cavitation medium or incorporated within the foam. The treatment time depends on the initial morphology of the sample, film thickness and the cavitation intensity. This time can range from 1 millisecond to one hour, preferably from ⅒ of a second to 15 minutes and most preferably from ½ second to 5 minutes.

In the present process the degree of fibrillation can be controlled to provide a low degree or high degree of fibrillation, whether from a uni- or biaxially oriented foam. A low degree of fibrillation may be desired to enhance the surface area by producing a schistose or fibrous surface and thereby imparting texture to the surface of the foam. Thus the present invention provides an oriented, foamed article having a fibrillated surface.

The greater surface area consequently enhances the bondability to other surfaces. Such articles are useful, for example as substrates for abrasive coatings and as receptive surfaces for printing, as hook and loop fasteners, as interlayer adhesives and as tape backings. Conversely, a high degree of fibrillation may be required to impart a highly fibrous texture to the surface to provide cloth-like films, insulating articles, filter articles or to provide for the subsequent harvesting of individual fibers or flakes (i.e., removal from the foam polymer matrix).

In either fibrillation process most of the fibers or flakes stay attached to the foam web due to incomplete release from the polymer matrix. Advantageously the fibrillated article, having fibers or flakes secured to a foam, provides a convenient and safe means of handling, storing and transporting the fibers. For many applications it is desirable to retain the fibers or flakes secured to the foam. Integral fibers, for example, may be extremely useful in many filtering applications—the present fibrillated article provides a large filtering surface area due to the microscopic size of the fibers while the non-fibrillated surface of the foam may serve as an integral support.

Optionally the microfibers or flakes may be harvested from the foam by mechanical means such as a porcupine roll, scraper, and the like. Harvested microfibers generally retain their bulkiness (loft) due to the high modulus of the individual microfibers and, as such, are useful in many thermal insulation applications. If necessary, loft may be improved by conventional means, such as those used to enhance the loft of blown microfibers, for example by the addition of staple fibers.

The present invention provides foams with a high surface area which enhances performance when used as adsorbents, such as in oil-adsorbent mats or batts used in the clean up of oil spills and slicks. The instant fibrillated articles are also conformable and drapeable compared to fibrillated films. Other potential uses include reinforcing fibers in the manufacture of composite materials to enhance interfacial bonding, multilayer constructions where the wicking effect of the fibrous surface is used to enhance multilayer adhesion or integrity, and in mechanical fastener applications, e.g. hook and loop fasteners. The fibers are especially useful as a reinforcing agent in concrete, due to the high surface area (which aids bonding), tensile strength (which prevents crack formation and migration), and low elasticity. Fibrillated foams may also be useful as tape backings or straps to yield an strong tape with cross-web tearability. When used as a tape backing, the fibrillated foam can be coated with any conventional hot melt, solvent coated, or like adhesive suitable for application to films. Either a fibrillated surface or non-fibrillated surface may be coated, or both surfaces may be coated. Advantageously, when using a biaxially oriented fibrillated foam of the present invention, the adhesive tapes prepared therefrom may be more easily torn in both the longitudinal or transverse direction as compared to uniaxially oriented fibrillated foams.

Many types of adhesives can be used. The adhesive can include hot melt-coated formulations, transfer-coated formulations, solvent-coated formulations, water-based, and latex formulations, as well as laminating, thermally-activated, and water-activated adhesives. These adhesives can be applied by conventional techniques, such as solvent coating by methods such as reverse roll, knife-over-roll, gravure, wire wound rod, floating knife or air knife, and hot-melt coating such as slot orifice coaters, roll coaters or extrusion coaters, at appropriate coating weights.

Examples of adhesives useful in the invention include those based on general compositions of polyacrylate; polyvinyl ether; diene-containing rubber such as natural rubber, polyisoprene, and polyisobutylene; polychloroprene; butyl rubber; butadiene-acrylonitrile polymer; thermoplastic elastomer; block copolymers such as styrene-isoprene and styrene-isoprene-styrene block copolymers, ethylene-propylene-diene polymers, and styrene-butadiene polymer; poly-alpha-olefin; amorphous polyolefin; silicone; ethylene-containing copolymer such as ethylene vinyl acetate, ethyl acrylate, and ethyl methacrylate; polyurethane; polyamide; epoxy; polyvinylpyrrolidone and vinylpyrrolidone copolymers; polyesters; and mixtures of the above. Additionally, the adhesives can contain additives such as tackifiers, plasticizers, fillers, antioxidants, stabilizers, pigments, diffusing particles, curatives, and solvents.

Useful adhesives according to the present invention can be pressure sensitive adhesives. Pressure sensitive adhesives are normally tacky at room temperature and can be adhered to a surface by application of, at most, light finger pressure. A general description of useful pressure sensitive adhesives may be found in *Encyclopedia of Polymer Science and Engineering*, Vol. 13, Wiley-Interscience Publishers (New York, 1988). Additional description of useful pressure sensitive adhesives may be found in *Encyclopedia of Polymer Science and Technology*, Vol. 1, Interscience Publishers (New York, 1964).

A pressure sensitive adhesive may be coated onto one side of the backing and a release coating (a low adhesion backsize (LAB) coating) may be optionally coated on the opposite side to allow the resultant tape to unwind from itself when wound in a roll or to release when in a pad form.

When utilized, the release coating composition should be compatible with the adhesive composition and not degrade the adhesive properties of the tape, such as by being transferred to the adhesive composition.

Release coating compositions for the LAB layer of tapes may include silicone, alkyl, or fluorochemical constituents, or combinations as the release imparting component. Useful release coating compositions for the invention include silicone containing polymers, such as silicone polyurethanes, silicone polyureas and silicone polyurethane/ureas, such as those described in U.S. Pat. Nos. 5,214,119, 5,290,615, 5,750,630, and 5,356,706, and silicone acrylate grafted copolymers described in U.S. Pat. Nos. 5,032,460, 5,202,190, and 4,728,571. Other useful release coating compositions include fluorochemical containing polymers such as those described in U.S. Pat. No. 3,318,852, and polymers containing long alkyl side chains such as polyvinyl N-alkyl carbamates (e.g., polyvinyl N-octadecyl carbamates) as described in U.S. Pat. No. 2,532,011, and copolymers containing higher alkyl acrylates (e.g., octadecyl acrylate or behenyl acrylate), such as those described in U.S. Pat. No. 2,607,711, or alkyl methacrylates (e.g., stearyl methacrylate) such as those described in U.S. Pat. Nos. 3,502,497 and 4,241,198, where the alkyl side chain includes from about 16 to 22 carbon atoms.

These release polymers can be blended with each other and with thermosetting resins or thermoplastic film forming polymers to form the release coating composition. In addition, other additives may be used in the release coating compositions such as fillers, pigments, wetting agents, viscosity modifiers, stabilizers, anti-oxidants, and cross-linking agents.

Numerous other layers can be added to the tape, such as primers to increase adhesive layer adhesion to the backing layer. Also, the release properties of the backing can be modified such that the backing and the adhesive cooperate to achieve desired unwind characteristics. The release properties of the backing can be modified by applying a low surface energy composition, priming, corona discharge, flame treatment, roughening, etching, and combinations.

EXAMPLES

Test Methods

Foam Density (ASTM D 792-86)

Foam samples were cut into 12.5 mm×25.4 mm specimens and weighed on a high precision balance available as Model AG245 from Mettler-Toledo, Greifensee, Switzerland. The volume of each sample was obtained by measuring the mass of water displaced at room temperature (25° C.). The density of the foam was obtained by the quotient of the mass and volume. Accuracy of this measurement is ±0.005 g/cm$^3$ Foam Cell Size Scanning electron microscopy was performed on all the foam samples using a scanning electron microscope available as model JSM-35C from JEOL, Peabody, Mass., operated at 5 and 10 kV. The samples were prepared by freezing in liquid nitrogen for 2–5 minutes and fracturing. A thin palladium-gold coating was evaporated on the samples to develop a conductive surface. The diameters of the foam cells were measured using the digital SEM micrographs and UTHSCSA Image Tool for Windows Software (Version 1.28, University of Texas, San Antonio, Tex.). The diameters of over 100 cells were measured and recorded. The average cell diameter (x) and standard deviation ($\sigma$) of the cell diameter was calculated using the Image Tool Software.

1. Fibrillation of Uniaxially Batch Oriented Foam

A high melt-strength polypropylene resin (PF814™, Montell North America, Inc., Wilmington, Del.) was mixed with a chemical blowing agent, azodicarbonamide (Aldrich Chemical Co., Milwaukee, Wis.) at 3 wt % in a twin screw extruder at 40 rpm with an temperature profile from 160° C. to 216° C. to 182° C. over the six zones of the extruder, creating pressures from 6.2 MPa to 20.7 MPa. The temperatures in the melt pump and neck tube are maintained at 170° C. The impregnated polymer melt was extruded through a 15.2 cm wide foam die (available from Extrusion Dies Inc., Canfield, Ohio.) and the resulting foamed polymer was collected on a chrome-plated roll chilled to 150° C. at a draw rate of approximately 3 meters/minute. Foam sheet thickness was approximately 1 mm (40 mils), density 0.56 g/cc, cell size less than 50 μm in largest dimension.

A sample of the foam sheet measuring approximately 5 cm×5 cm was stretched in the machine direction in a laboratory-scale batch orienter at 130° C. at a draw ratio of 5:1 and a rate of 20%/minute. Density of the sheet decreased to 0.42 g/cc as a result of orientation, while foam thickness decreased to approximately 0.25 mm.

Fibrillation of the stretched, foam sheet was carried out in a hydroentangling machine (Model 2303, Honeycomb Systems, Inc., Bridgeport, Me.) using deionized water at 23° C. and a line speed of approximately 1.5 m/min. Water at approximately 10.4 MPa (1500 psi) was sprayed through jets that were 0.127 mm diameter at 0.38 mm pitch. A fibrillated foam was produced wherein the fibers were between 10 μm and 80 μm thick, as viewed in a SEM image thereof.

2. Fibrillation of Continuously Uniaxially Oriented Foam

A foam sheet was prepared from high melt-strength polyproplyene as described in Example 1, except that the temperature profile was 190° C. to 225° C. to 175° C. over the six zones of the extruder, creating pressures from 11.0 MPa to 24.8 MPa. The foam exhibited a density of 0.43 g/cc and foam cell sizes of less than 50 μm in their largest dimension.

The sheet was fed into a continuous length-orienting stretcher and elongated at a 12:1 ratio at 120° C. to provide a foam sheet having a density of 0.30 g/cc.

Fibrillation of the drawn foam sheet was carried out as described in Example 1, to yield a cloth-like product having fibers less than approximately 10 μm thick with a high aspect ratio (length to thickness), according to an SEM image thereof.

3. Fibrillation of Uniaxially Batch-Oriented PP/Elastomer Blend

A 70:30 blend (w/w) of high melt-strength polypropylene (PF814™, as described in Example 1) and elastomeric polypropylene (ENGAGE™ 8200, DuPont Dow Elastomers LLC, Wilmington, Del.) was extruded as a foam as described in Example 1, except that the temperature profile was 185° C. to 225° C. to 160° C. over the six zones of the extruder, creating pressures from 11.0 MPa to 24.8 MPa. Uniaxial orientation in a laboratory-scale batch orienter at 130° C. and a draw ratio of 5:1 produced a soft-feeling foam having a density of 0.38 g/cc.

The oriented foam was fibrillated-using a hydroentangler, as described in Example 1, except that the water pressure was 8.3 Mpa (1200 psi). A fabric product having an excellent cloth-like hand was obtained.

What is claimed is:

1. An oriented, high melt strength polypropylene foam having a fibrillated surface wherein said high-melt-strength polypropylene comprises homo- and copolymers containing 50 weight percent or more propylene units, and having a melt-strength in the range of 25 to 60 cN at 190° C.

2. The polypropylene foam of claim 1 wherein said foam is uniaxially oriented.

3. The foam of claim 2 wherein said orientation is at least 3× total draw ratio.

4. The polypropylene foam of claim 2 wherein said fibrillated surface is fibrous.

5. The polypropylene foam of claim 1 wherein said foam is biaxially oriented.

6. The foam of claim 5 wherein said orientation is at least 3 to 50× total draw ratio.

7. The foam of claim 5 wherein said fibrillated surface is schistose.

8. The foam of claim 1 wherein said polypropylene copolymers are selected from random, block, and grafted copolymers of propylene and an α-olefin selected from the group consisting of C3–C8 α-olefins and C4–C10 dienes.

9. The foam of claim 8 wherein the amount of said α-olefin is less than 45 wt. %.

10. The foam of claim 8 wherein said α-olefin is selected from the group consisting of 1-butene, isobutylene, 1-pentene, 3-methyl-1-butene, 1-hexene, 3,4-dimethyl-1-butene, 1-heptene, and 3-methyl-1-hexene.

11. The foam of claim 9 wherein said C4–C10 diene is selected from the group consisting of 1,3-butadiene, 1,4-pentadiene, isoprene, 1,5-hexadiene, and 2,3-dimethyl hexadiene.

12. The oriented foam of claim 1 further comprising the residue of a physical or chemical blowing agent.

13. The oriented foam of claim 1 further comprising a layer of adhesive.

14. The foam of claim 1 comprising a blend of said high melt strength polypropylene and a polymer selected from the group consisting of high, medium, low and linear low density polyethylene, fluoropolymers, poly(1-butene), ethylene/acrylic acid copolymer, ethylene/vinyl acetate copolymer, ethylene/propylene copolymer, styrene/butadiene copolymer, ethylene/styrene copolymer ethylene/ethyl acrylate copolymer, ionomers and thermoplastic elastomers.

* * * * *

UNITED STATES PATENT AND TRADEMARK OFFICE
CERTIFICATE OF CORRECTION

PATENT NO. : 6,646,019 B2
DATED : November 11, 2003
INVENTOR(S) : Perez, Mario A.

It is certified that error appears in the above-identified patent and that said Letters Patent is hereby corrected as shown below:

Column 2,
Line 20, below "formula:" insert -- $\rho_R = \left[1 - \frac{\rho_L}{\rho_o}\right] \times 100\%$ --.

Line 22, delete "$\rho_o$" and insert in place thereof -- $\rho_f$ --.

Column 3,
Line 44, after "hexene" delete ";" and insert inplace thereof -- , --.

Column 6,
Line 3, delete "preparation" and insert in place thereof -- preparations --.

Column 17,
Line 50, after "fibrillated" delete "-".

Column 18,
Line 5, after "surface" insert -- , --.
Line 5, after "high" delete "-".

Signed and Sealed this

Twelfth Day of April, 2005

JON W. DUDAS
*Director of the United States Patent and Trademark Office*